United States Patent
Brandl et al.

(10) Patent No.: US 10,033,254 B2
(45) Date of Patent: Jul. 24, 2018

(54) CAGE ROTOR AND BAR COMPRISING A NOTCH

(71) Applicant: Siemens Aktiengesellschaft, München (DE)

(72) Inventors: Konrad Brandl, Thalmassing (DE);
Maximilian Pfaller, Nürnberg (DE);
Patryk Piotrowski, Nürnberg (DE);
Andre Trepper, Erlangen (DE);
Christian Deeg, Altdorf (DE);
Siegfried Fichtner, Allersberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/439,556

(22) PCT Filed: Oct. 17, 2013

(86) PCT No.: PCT/EP2013/071747
§ 371 (c)(1),
(2) Date: Apr. 29, 2015

(87) PCT Pub. No.: WO2014/067792
PCT Pub. Date: May 8, 2014

(65) Prior Publication Data
US 2015/0303781 A1    Oct. 22, 2015

(30) Foreign Application Priority Data
Oct. 30, 2012 (EP) .................................. 12190603

(51) Int. Cl.
*H02K 17/16* (2006.01)
*H02K 15/02* (2006.01)
*H02K 15/00* (2006.01)

(52) U.S. Cl.
CPC ....... *H02K 17/165* (2013.01); *H02K 15/0012* (2013.01)

(58) Field of Classification Search
CPC ...... H02K 17/16; H02K 17/165; H02K 18/16; H02K 18/185
(Continued)

(56) References Cited

U.S. PATENT DOCUMENTS 3,083,313 A * 3/1963 Boles ................... H02K 17/165
                                                              310/212
7,362,027 B2    4/2008 Fichtner et al.
(Continued)

FOREIGN PATENT DOCUMENTS

CH         683957 A5      6/1994
CN      102480181 A       5/2012
(Continued)

OTHER PUBLICATIONS

Notch. (n.d.) Collins English Dictionary—Complete and Unabridged, 12th Edition 2014. (1991, 1994, 1998, 2000, 2003, 2006, 2007, 2009, 2011, 2014). Retrieved Sep. 29 2016 from http://www.thefreedictionary.com/notch.*
(Continued)

*Primary Examiner* — Thomas Truong
(74) *Attorney, Agent, or Firm* — Henry M. Feiereisen LLC (57) ABSTRACT

A cage rotor for an electrical machine includes a rotor laminated core having a groove, and a short-circuiting ring having a first material and cast onto an axial end of the rotor laminated core. Arranged in the groove is a bar which has a bar end. The bar end penetrates into the first material of the short-circuiting ring and has a plurality of notches to provide the bar end with a greater flexibility.

12 Claims, 10 Drawing Sheets

(58) Field of Classification Search
USPC .................................................. 310/211, 212
See application file for complete search history.

(56) References Cited

U.S. PATENT DOCUMENTS

| | | | |
|---|---|---|---|
| 8,283,817 | B2 | 10/2012 | Weiss et al. |
| 8,519,580 | B2 | 8/2013 | Brandl et al. |
| 2003/0184184 | A1* | 10/2003 | Lawrence .......... H02K 15/0012 310/261.1 |
| 2011/0254400 | A1* | 10/2011 | Vallejo ................ H02K 17/165 310/211 |
| 2013/0187512 | A1* | 7/2013 | Buttner ............... H02K 17/165 310/211 |
| 2013/0270939 | A1 | 10/2013 | Brandl et al. |

FOREIGN PATENT DOCUMENTS

| | | |
|---|---|---|
| CN | 102598485 A | 7/2012 |
| CN | 102651592 A | 8/2012 |
| CN | 102684435 A | 9/2012 |
| DE | 1116311 B | 11/1961 |
| DE | 1176748 B | 8/1964 |
| JP | 2005/278372 A | 10/2005 |
| SU | 1056844 A1 | 11/1984 |
| SU | 1249660 A1 | 8/1986 |
| WO | WO 2012041943 A2 | 4/2012 |

OTHER PUBLICATIONS

Beijing Electric Power College; "Electric Machinery"; pp. 324-326; 1979.

* cited by examiner

CAGE ROTOR AND BAR COMPRISING A NOTCH

CROSS-REFERENCES TO RELATED APPLICATIONS

This application is the U.S. National Stage of International Application No. PCT/EP2013/071747, filed Oct. 17, 2013, which designated the United States and has been published as International Publication No. WO 2014/067792 and which claims the priority of German Patent Application, Serial No. 12 190 603.6, filed Oct. 30, 2012, pursuant to 35 U.S.C. 119(a)-(d).

BACKGROUND OF THE INVENTION

The invention relates to a cage rotor according to the preamble of claim 1, an electrical machine which includes the cage rotor and a bar for the cage rotor. The invention further relates to a method for manufacturing the cage rotor.

Such a cage rotor is known from WO 2012/041943 A2. In this patent measures are described for improving the quality of a squirrel cage rotor and of an asynchronous machine, in order to overcome or to reduce the problems arising in such devices. The patent describes that a cage rotor of an asynchronous machine has a bar in a rotor laminated core, wherein the bar is able to be tipped at a tipping point. The bar is advantageously able to be tipped such that its ends can be tipped towards an axis of the squirrel cage rotor. A gap to the bar is thus produced in the end area of the rotor laminated core, wherein the bar can bend in the direction of the gap. The gap thus makes possible a bending of the ends of the rotor bars towards the axis. This has the advantage that the bar can yield to a force which arises when, during the hardening of the melt, the short-circuiting ring contracts and exercises a force on the bar in the direction of the axis of the squirrel cage rotor. This counteracts the problem of the contact resistance between the short-circuiting ring and the bar increasing if the bar cannot follow the short-circuiting ring shrinking during the cooling-off process. The connection point between bar and short-circuiting ring is definitively responsible for the operating data of the squirrel cage rotor or of the electrical machine. An improvement therein automatically leads to better electrical data, especially the efficiency.

Because of efforts to reduce the energy consumption significantly it is of central importance to make a further technical contribution which, on its own, as an alternative or in combination with known measures, makes possible a highly-efficient electrical machine.

SUMMARY OF THE INVENTION

The underlying object of the invention is therefore to provide a highly-efficient cage rotor for an electrical machine.

According to one aspect of the invention, the object is achieved by a cage rotor for an electrical machine comprising
  a rotor laminated core which has a groove,
  a short-circuiting ring cast onto an axial end of the rotor laminated core, comprising a first material, and
  a bar which is arranged in the groove and has a bar end, wherein the bar end penetrates into the first material wherein the bar end penetrating into the first material has at least one notch.

According to another aspect of the invention, the object is also achieved by an electrical machine with a cage rotor as described above.

The inventive electrical machine comprises an inventive cage rotor.

According to another aspect of the invention, the object is also achieved by a bar for a cage rotor as described above.

An inventive bar is for an inventive cage rotor.

According to another aspect of the invention, the object is achieved by a method for manufacturing a cage rotor, wherein the bar end which has the at least one notch is arranged in the groove in a bendable manner.

In the inventive method for manufacturing an inventive cage rotor the bar end having the at least one notch is arranged in the groove in a bendable manner.

The bar end can advantageously have a number of notches. In this way the bendability of the bar end can be improved and a cross-sectional surface of the cross-sectional planes effective for the electrical resistance can advantageously be achieved. Thus a notch, when referred to below, can stand for at least one notch, advantageously for a number of notches.

The inventive cage rotor advantageously achieves the object by the bar end being able to be bent by virtue of a notch. This enables the bar end to advantageously follow a shrinkage of the first material during the hardening after or during the casting-on of the short-circuiting ring, since a radial bending moment of the bar, which counteracts forces acting on the bar end during the shrinkage of the first material, is reduced by the notch on the bar end. Through this an advantageous connection between the bar and the cast-on short-circuiting ring is achieved, which leads to a low electrical resistance between the bar and the short-circuiting ring and thus leads to a highly-efficient cage rotor for an electrical machine.

Furthermore a mechanically solid connection between the bar and the cast-on short-circuiting ring is achieved, since the bar can follow the shrinkage of the first material accordingly during hardening of the melt.

Depending on the forces which act on the bar end during the shrinkage of the first material, the bar end can exhibit a bending. The deformation that the bar end undergoes in this case can be an elastic deformation. Thus a linear relationship exists between the force acting through the hardening of the melt and the distance by which the bar follows the hardening melt.

The deformation of the bar end can be a plastic deformation. This enables the forces acting during the shrinkage of the first material to be counteracted with a defined opposing force, of which the timing is adapted to the timing of the acting forces such that an advantageous connection between the bar and the cast-on short-circuiting ring is achieved.

The bar has its greatest extent in an axial bar direction from the bar end to a further bar end, which is measured as the bar length. Cross-sectional planes extend at right angles to the axial bar direction within the bar. In the cross-sectional planes the bar has a first bar direction in which a bar width is measured and it has a second bar direction in which a bar height is measured.

The bar height can advantageously be larger than the bar width. Inter alia this gives the bar a high effective electrical resistance when an electrical machine with the cage rotor is starting up and a low effective electrical resistance during operation of the electrical machine.

The bar can advantageously be unsymmetrical to the first bar direction. The non-symmetry of the bar to the first bar direction enables an unsymmetrical geometry for cross-sectional planes of the bar to be selected so that, when an electrical machine with the cage rotor is started up, the bar has an advantageously high effective electrical resistance, which advantageously changes as the rotational speed of the cage rotor increases during operation of the electrical machine, into a low effective electrical resistance.

The bar length, bar width and bar height are dimensions of the bar. The bar has a second material, which can be copper for example.

One surface of the bar end has the notch, wherein the notch extends from the surface of the bar with a notch depth into the bar. Thus the notch has a cut surface with the bar.

The notch can advantageously be manufactured with little effort. Thus the notch can be manufactured with little effort by sawing into the bar.

During operation of the electrical machine electrical energy can also be applied via a winding of the stator and be converted by the magnetic interaction between stator and cage rotor into mechanical energy. In such cases rotation is imparted to the cage rotor and mechanical energy can be output at a shaft, in the form of a rotational movement, to a mechanical consumer.

For the rotation of the cage rotor about an axis of rotation the cage rotor has a shaft which extends along the axis of rotation and is fastened to the rotor laminated core. The rotor laminated core comprises sheets of metal which are arranged laminated from one axial end of the rotor laminated core to another axial end of the rotor laminated core. The sheets of metal have openings to accept the bar, which form the groove. For the magnetic interaction of the cage rotor with the stator the cage rotor has a winding. The winding encloses the bar and the cast-on short-circuiting ring which short-circuits the winding. The lower is the electrical resistance, especially the effective resistance during operation of the electrical machine, of the winding of the cage rotor, the higher is the efficiency which is achieved for an electrical machine with the cage rotor. In order to achieve an advantageous rotation of the cage rotor in the electrical machine, the cage rotor has one or more further bars, wherein the bar and the further bar or bars extend from the axial end of the rotor laminated core to the further axial end of the rotor laminated core, and are connected at the axial end by the cast-on short-circuiting ring electrically and mechanically advantageously, in the same way as the bar is connected to the cast-on short-circuiting ring. At the further axial end of the rotor laminated core the bar and the further bar or bars are correspondingly connected by a further cast-on short-circuiting ring in the same way as the bar at the bar end to the cast-on short-circuiting ring. For a fastening of the bar, of the further bar or the further bars the first material of the cast-on short-circuiting ring can extend through the groove to the further cast-on short-circuiting ring.

An axial direction is a direction in parallel to the axis of rotation, a radial direction is a direction at right angles to the axis of rotation. Moving away from the axis of rotation in a radial direction, first of all the base of the groove is reached and then the bar which is arranged in the groove.

An electrical machine can have a housing to protect the electrical machine in which the stator is arranged and the rotor is supported rotatably between the stator. The cage rotor can be supported rotatably via the shaft by bearings in the housing.

An inventive electrical machine, as well as the advantages already explained, can also have the further advantage that, in addition to the high efficiency of the electrical machine, the bearings for supporting the cage rotor in the housing exhibit lower wear. As a result of the notch on the bar end, deviations in a symmetrical mass distribution of the cage rotor occur to a greater extent at the bar end. At the short-circuiting ring these can be compensated for advantageously in the immediate vicinity simply by balancing weights, so that a slight imbalance of the cage rotor is achieved. The low wear of the bearings causes low friction losses in the bearings, so that a highly efficient electrical machine can be made available.

An inventive method for manufacturing an inventive cage rotor also has the further advantage that the bar end is advantageously bent during the casting-on of the short-circuiting ring. Inter alia the bar end can be bent in stages by the forces acting on it during hardening of the melt, without hindering the manufacturing of the cage rotor.

Advantageous embodiments of the invention are specified in the dependent claims.

Thus one embodiment of the inventive cage rotor is advantageous in which the bar end has a stronger bending by virtue of the at least one notch than a bar section which is arranged within the groove. This enables the bar end to follow the shrinkage of the melt with a smaller bending of the bar in the groove. The bar can advantageously be supported in the groove. In this way a lower imbalance of the cage rotor can be achieved. Advantageously empty space in the groove is avoided, which would cause a movement of the bar in the groove, e.g. at high rotational speeds of the bar. Thus a lower wear on the bearings is achieved.

The bar can advantageously fill out the groove. Inter alia the cross-section of the groove is completely used for the bar in this way, through which an advantageously low electrical resistance is achieved.

The bar can advantageously be arranged in a groove base of the groove. Thus a high level of filling the cross-section of the groove can be achieved, wherein the first material is advantageously present in an area of the groove which is at a greater distance in a radial direction from the axis of rotation than the bar. Thus an advantageously low electrical resistance is achieved.

The groove can advantageously have an area which is filled with the first material. The first material can advantageously harden in the area and inter alia the hardening of the first material in the area is disturbed less by the smaller bending of the bar in the groove, so that the first material advantageously has properties after hardening which are achieved in a defined manner. Thus electrical machines with a high level of efficiency can be made available.

In a further advantageous embodiment of an inventive cage rotor an outer surface of the bar has the notch. The notch can advantageously be made in a simple manner on the outer surface of the bar end. Inter alia the bar can advantageously be fixed in a simple manner for making the notch in the outer surface. In particular if the cut surface extends over more than 60 percent of the bar height a bendability of the bar ends is achieved in which the bar can advantageously follow a shrinkage of the first material during hardening of the melt after or during a casting-on of the short-circuiting ring. In particular in such cases the notch is located in an area of the outer surface which faces away in a radial direction from the axis of rotation. In this way a necessary degree of bendability of the bar ends is achieved.

The outer surface can have a further notch on a side of the outer surface lying opposite the notch, wherein the outer surface has the further notch offset in the axial bar direction to the notch. In this way a higher degree of bendability of the bar end can advantageously be achieved, wherein the electrical resistance of the bar is advantageously low, since the value for the smallest effective cross-sectional area for the electrical resistance is unchanged in relation to the bar with only one notch.

In a further advantageous embodiment of an inventive cage rotor an end face surface of the bar has the notch. The end face surface is the cross-sectional plane which is visible on the bar end or on the further bar end in a non-assembled state of the bar since it forms one surface of the bar. The fact that the end face surface of the bar has the notch increases the bendability of the bar end, wherein the low electrical resistance of the bar over the entire bar length is retained to a large degree. It is also advantageous that the rigidity of the bar over the entire bar length only deviates to a small extent. The bar thus exhibits an advantageous mechanical stability.

In a further advantageous embodiment of an inventive cage rotor the notch extends on the end face surface in a direction which has a greatest vectoral component in a first bar direction in terms of its amount. The bendability of the bar end is advantageously increased by this, since the resistance moment of the bar end is lowered. In particular the bendability of the bar is advantageously increased if the bar has a bar height which is greater than the bar width. In particular the notch advantageously extends in the end face surface in the first direction in order to achieve a maximum advantageous lowering of the resistance moment by the notch in the end face surface.

In a further advantageous embodiment of an inventive cage rotor the notch extends on the end face surface in a direction which has a greatest vectoral component in a second bar direction in terms of its amount. By virtue of the notch in the end face surface an advantageous lowering of the resistance moment is achieved, which leads to an advantageous bendability of the bar end.

If the bar has a notch in the end face surface which, as described, essentially extends in a first bar direction, in an advantageous manner a further notch can be present on the end face surface which extends in a direction which, as described, essentially extends in the second bar direction. Thus areas between the notches have an advantageously large dimension in the first and in the second bar direction.

Inter alia the areas between the notches can be guaranteed so that the areas remain connected to the bar during the manufacturing of cage rotor so that they are connected to the bar with a low electrical resistance.

In a further advantageous embodiment of an inventive cage rotor the cut surface extends from the bar end to a further bar end of the bar. Advantageously a better bendability of the bar the bar end is achieved. Inter alia conductor elements which form a bar can expand or contract with lower mutual influencing while affected by the force acting on the bar during hardening of the melt. The cut surface extends in such cases between the conductor elements which extend in the axial bar direction, wherein cross-sections of the conductor element are arranged within the cross-sectional planes of the bar. The cross-sectional planes of the bar form an envelope curve which surrounds the conductor elements.

The notch can advantageously be manufactured with little effort. Thus the notch can have been manufactured by arranging the conductor elements in relation to the envelope curve of the bar.

The conductor elements can have circular cross-sections. This advantageously enables better bendability to be achieved at the bar end.

The conductor elements can have circular cross-sections with a diameter having a value of up to 1 millimeter. In this way better bendability on the bar end is advantageously achieved for a larger surface between conductor elements and short-circuiting ring. Thus a low electrical resistance is advantageously achieved for a connection between the conductor elements and the short-circuiting ring.

The conductor elements can have a rectangular cross-section. In this way greater filling of the groove with the conductor elements can be advantageously achieved. Thus a low electrical resistance of the bar is achieved.

In a further advantageous embodiment of an inventive cage rotor the notch ends within the bar. In this way bendability of the bar end with an advantageously low bendability in the center of the bar is advantageously achieved.

Thus the bar end can project from the groove at an axial end of the rotor laminated core by an exit length, wherein the notch has a cut depth which advantageously amounts to half the exit length and at a maximum to the exit length. The notch can be manufactured here with little effort by sawing into the bar, since inter alia the saw cut can be made in a simple manner down to the penetration depth of the notch.

In a further advantageous embodiment of an inventive cage rotor the bar has a connection facility at the notch. The bar is advantageously held together at the notch, wherein an advantageous inventive bendability and an advantageous inventive low electrical resistance of the winding of the cage rotor are achieved. Inter alia a more precise insertion of the bar during the manufacturing is achieved by the connection facility at the notch, so that during manufacturing of the cage rotor or electrical machines with the cage rotor, electrical machines with high-efficiency can be produced.

The connection facility can be a bracket which surrounds the bar so that arranging the bar in the groove is not hindered. The bracket can advantageously be attached to the bar, especially by a force fit. Inter alia the bracket can be arranged on the bar with little effort.

The connection facility can be a third material which at least partly fills up the notch, wherein the third material, at a temperature which is at least equal to the melting point of the first material, makes it possible for the bar end to bend with a lower force than for a bar which only consists of the first material. The bar can in this way have the shape usually used for a cage rotor. Inter alia small, especially no adaptations of the cage rotor to the changed bar geometry are necessary which lead to a worsening of the efficiency of the electrical machine. The customary manufacturing processes can also advantageously be used with high quality for obtaining a highly-efficient cage rotor.

The notch can advantageously be manufactured with little effort. Thus the notch can be made by arranging the conductor elements in relation to the envelope curve of the bar and by at least partly filling the notch with the third material in a molten state.

So that the bending of the bar end is made possible with a lower force than for a bar which only consists of the first material, the third material can only fill out the notch partly in the axial bar direction. In this way an advantageously solid point-type connection can be achieved by the third material.

So that the bending of the bar end is made possible with a lower force than for a bar which only consists of the first material, the third material can have a melting point which has a value of up to a value of the melting point of the first material. In this way the bar is advantageously still bendable during the hardening of the melt and is advantageously solid after the hardening.

BRIEF DESCRIPTION OF THE DRAWING

The characteristics, features and advantages of this invention described above as well as the manner in which these are achieved will become clearer and easier to understand in conjunction with the following description of the exemplary embodiments, which are explained in greater detail in conjunction with the figures, in which.

DETAILED DESCRIPTION OF PREFERRED EMBODIMENTS

Figure 1:
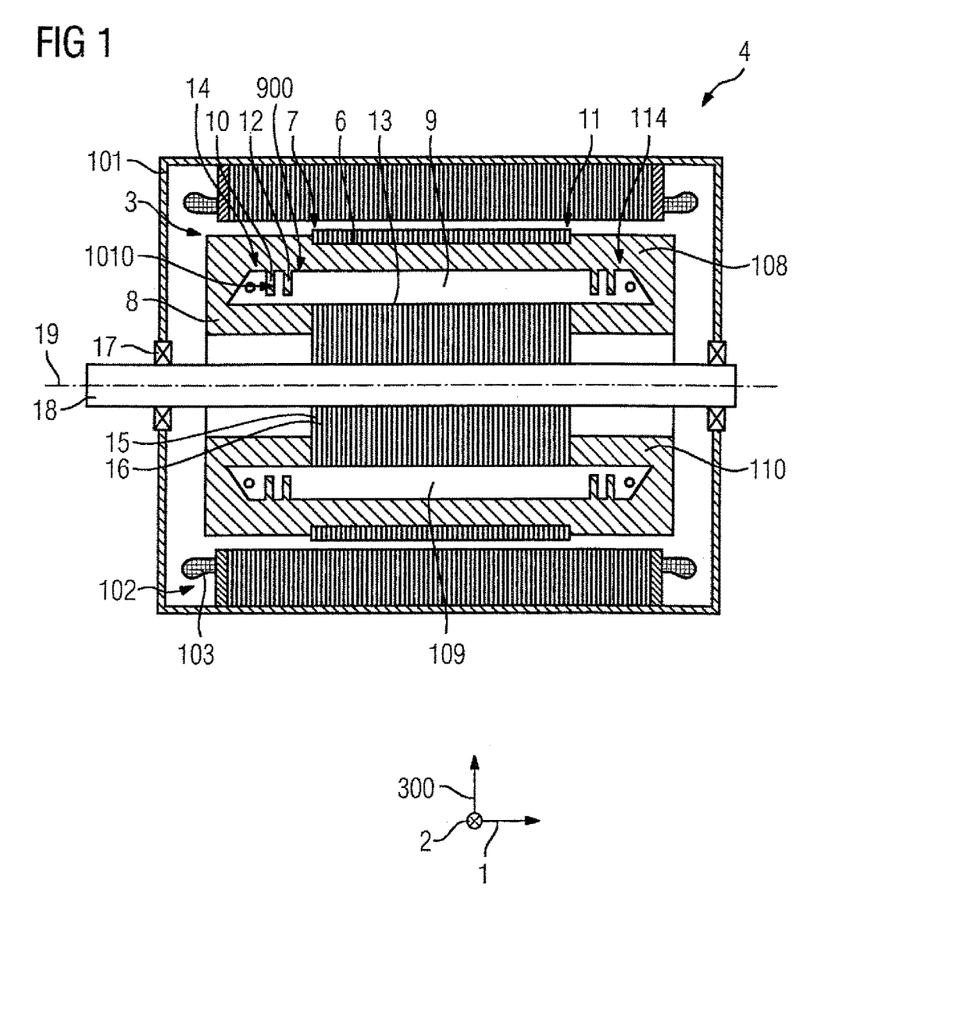
FIG. 1 shows a first exemplary embodiment of an electrical machine, which comprises a first exemplary embodiment of a cage rotor.

FIG. 1 shows a first exemplary embodiment of an electrical machine 4, which comprises a first exemplary embodiment of a cage rotor 3. The electrical machine 4 is an asynchronous machine and has a housing 101 in which the stator 102 is arranged. The stator 102 has a winding 103. The cage rotor 3 is attached to a shaft 18 which is supported rotatably via roller bearings 17 about the axis of rotation 19 in the housing 101. The cage rotor 3 comprises a rotor laminated core 5 having a groove 6, a short-circuiting ring 8 cast onto one axial end 7 of the rotor laminated core 5, which comprises a first material 108, and a bar 9 which is arranged in the groove 6 and has a bar end 14. The rotor laminated core 5 comprises sheets of metal which are arranged laminated from the axial end 7 of the rotor laminated core 5 to a further axial end 11 of the rotor laminated core 5. The rotor laminated core 5 has for example a laminated sheet 15 at the axial end 7 and a further laminated sheet 16. A notch 10 enables the bar end 14 to be bent, wherein the notch 10 has a cut surface 1010 with the bar end 14. The first material 108 is aluminum and has been cast onto the cage rotor 3 in a die casting process.

A winding of the cage rotor 3 has the bar 9, a further bar 109, the short-circuiting ring 8 and a further short-circuiting ring 110, as well as further bars which are arranged in further grooves of the cage rotor 3. The bar ends of the further bar 109 and of the further bars are advantageously embodied in the same way as the bar end 14, so that these are advantageously connected electrically and mechanically by the cast-on short-circuiting ring 8 in the same way as the bar 9 is connected to the cast-on short-circuiting ring 8. At the further axial end 11 of the rotor laminated core 5 the bar 9 and the further bar 109 or further bars are accordingly advantageously connected by a further cast-on short-circuiting ring 110 in the same way as the bar end 14 is connected to the cast-on short-circuiting ring 8. The bar 9, the further bar 109 and the further bars comprise a second material, which is copper.

An axial direction is a direction parallel to the axis of rotation 19, a radial direction is a direction at right angles to the axis of rotation 19. Moving away from the axis of rotation in a radial direction, first of all the base of the groove 13 is reached and then the bar 19 which is arranged in the groove 6.

The bar end 14 has a further notch 12, so that the bar end has a number of notches. In this way a greater degree of bendability of the bar end 14 can advantageously be achieved, wherein the electrical resistance of the bar 9 is advantageously low since the value for the smallest effective cross-sectional area for the electrical resistance compared to a bar with only one notch 10 is unchanged. An outer surface 900, which is a surface of the bar end 14, has the notch 10 and the further notch 12 in an area of the outer surface 900 which is facing away in a radial direction from the axis of rotation 19. The cut surface 1010 extends over more than 60 percent of a bar height, so that the bar 9 can follow a shrinking of the first material 108 during the hardening of the melt after or during casting-on of the short-circuiting ring 8. In this way the bar 9 can follow the shrinkage of the first material 108 during hardening of the melt in the direction of the axis of rotation 19.

The notches 10, 12 extend from the outer surface 900 with a notch depth into the bar 9. The notch depth amounts to more than 60 percent of the bar height. The bar end 14 has a greater bendability than a bar section which is arranged within the groove 6. The greater bendability is not shown in any of the figures. The bar section is located between the axial end 7 and the further axial end 11 of the rotor laminated core 5.

The bar 9 has a greater extent in axial bar direction 1 from the bar end 14 to a further bar end 114, which is measured as the bar length. The bar 9 is essentially arranged in the groove 6 so that an axial direction of the cage rotor 3 or of the electrical machine 4 runs in parallel to the axial bar direction 1. Cross-sectional planes extend at right angles to the axial bar direction 1 within the bar 9. The bar 9 has a first bar direction 2 in the cross-sectional planes in which a bar width is measured and a second bar direction 300 in which a bar height is measured. The bar height is greater than the bar width. The bar 9 is unsymmetrical to the first bar direction 2, since it has cross-sectional planes with an envelope curve like the bar 49 in the fourth exemplary embodiment according to FIG. 5.

Figure 2:
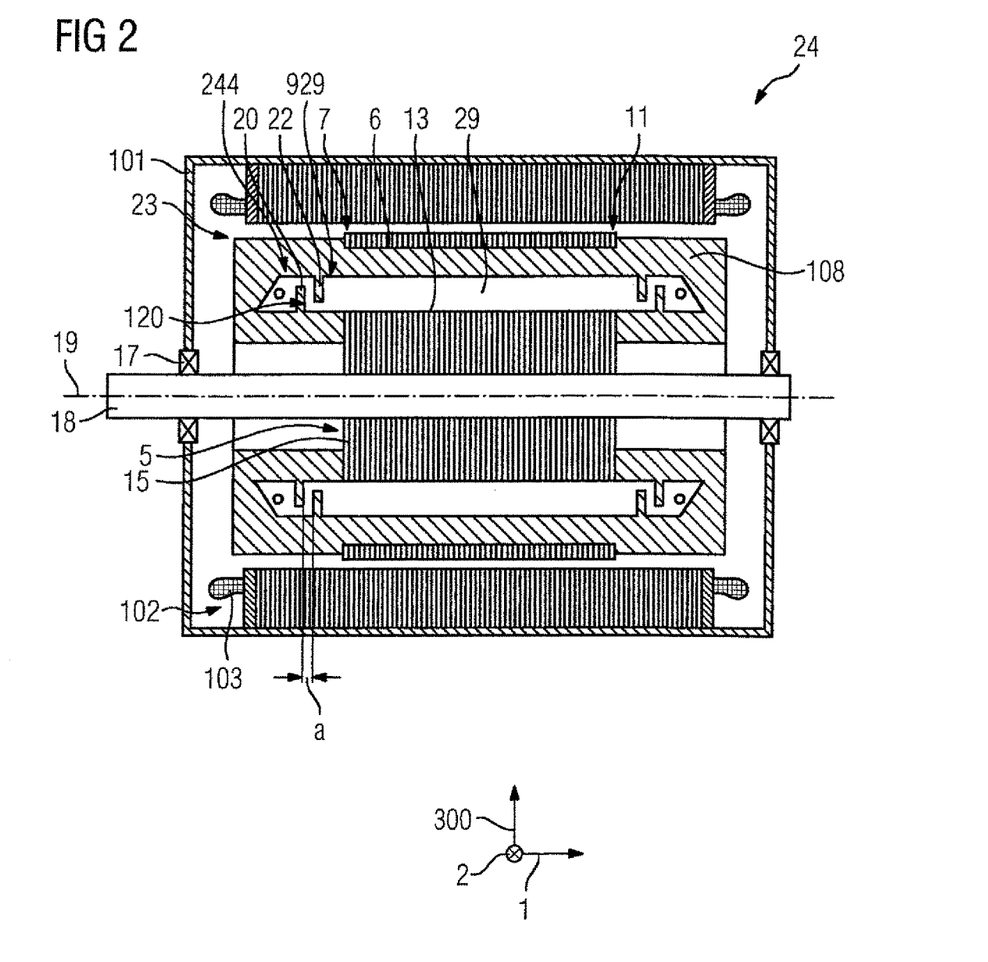
FIG. 2 shows a second exemplary embodiment of an electrical machine, which comprises a second exemplary embodiment of a cage rotor.

FIG. 2 shows a second exemplary embodiment of an electrical machine 24 which includes a second exemplary embodiment of a cage rotor 23. The bar end 244 is able to be bent by virtue of a notch 22 which the bar end has in an area of the outer surface 929 which is facing away in a radial direction from the axis of rotation 19. An outer surface 929 of the bar 29, in addition to the notch 22, has a further notch 20 on a side of the outer surface 929 lying opposite the notch 22, wherein the outer surface 929 has the further notch 20 in the axial bar direction 1 offset to the notch 22. Thus the bar end 244 is advantageously yielding in the axial bar direction 1 so that the bar end 244 can if necessary also yield to forces acting in the axial bar direction 1 during the shrinkage of the first material 108 of the melt. The further notch 20 is offset in the axial bar direction so that an axial distance a of the further notch 20 from the notch 22 in the axial bar direction 1 at least corresponds to a value which reduces the bar height by the notch depth of the notch 22 or of the further notch 20.

In this way a higher degree of bendability of the bar end 244 can advantageously be achieved, wherein the electrical resistance of the bar 29 is advantageously low, since the value for the smallest effective cross-sectional area for the electrical resistance compared to a bar 29 with only one notch 22 is unchanged. Thus a more effective cross-section for the electrical resistance is achieved, which is essentially determined by the notch depth.

The notch 22 and the further notch 20 extend over more than 60 percent of the bar height into the bar 29.

Figure 3:
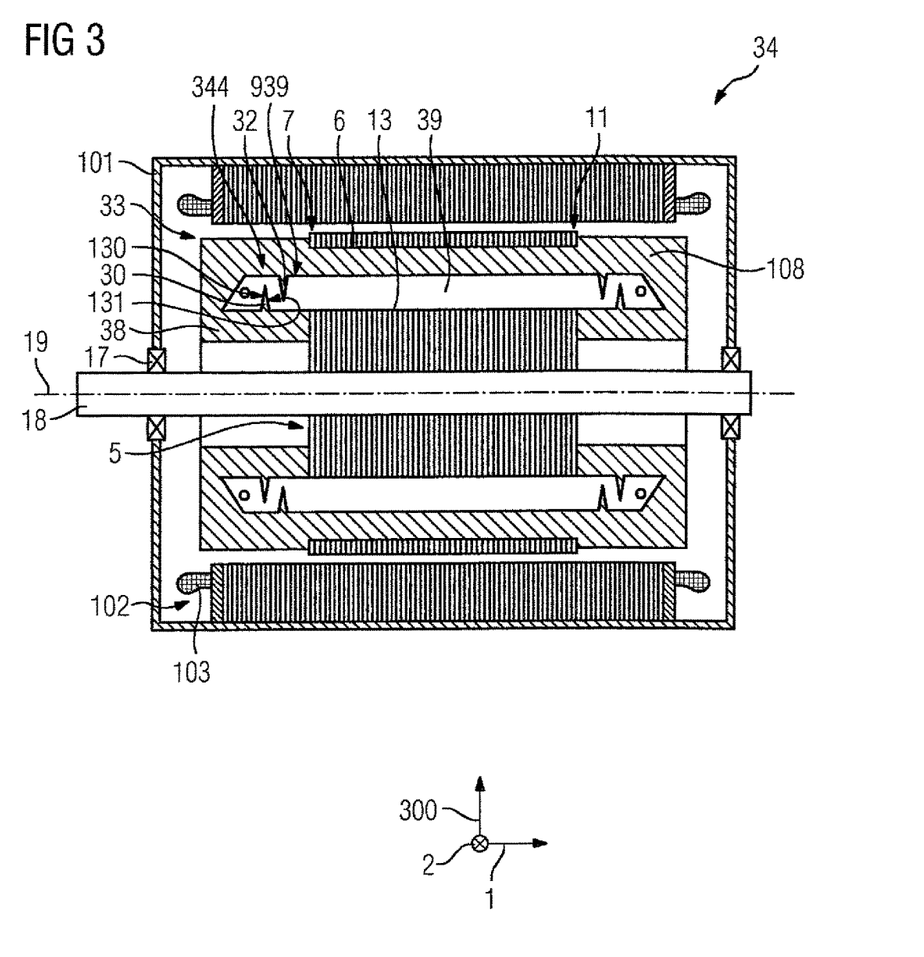
FIG. 3 shows a third exemplary embodiment of an electrical machine, which comprises a third exemplary embodiment of a cage rotor.

FIG. 3 shows a third exemplary embodiment of an electrical machine 34, which comprises a third exemplary embodiment of a cage rotor 33. A notch 32, which the bar end 344 has in an area of an outer surface 939, allows the bar to be bent in a radial direction facing away from the axis of rotation 19. The outer surface 939 of the bar end 344 of a bar 39 has the notch 32. The bar 39 has a further notch 30 which forms a cut surface 130 with the bar end 344. The further notch 30 has a further cut surface 131 with the bar end 344. The further notch 30 extends in the shape of a wedge from the outer surface 939 into the bar 39 to a notch depth. The notch 32 extends from the outer surface 939 in the form of a wedge into the bar 39 to a notch depth. This enables the first material 108, during hardening after or during the casting-on of the short-circuiting ring 38 during shrinkage, to rest or press on the bar 39 so that a connection between bar 39 and the short-circuiting ring 38 with low electrical resistance arises. The penetration depth of the notch 32 and of the further notch 30 amounts to more than 60 percent of the bar height of the bar 39. The outer surface 939 has the further notch 30 on a side opposite the notch 32, wherein the outer surface 939 has the further notch 30 offset in the axial bar direction 1 in relation to the notch 32.

Figure 4:
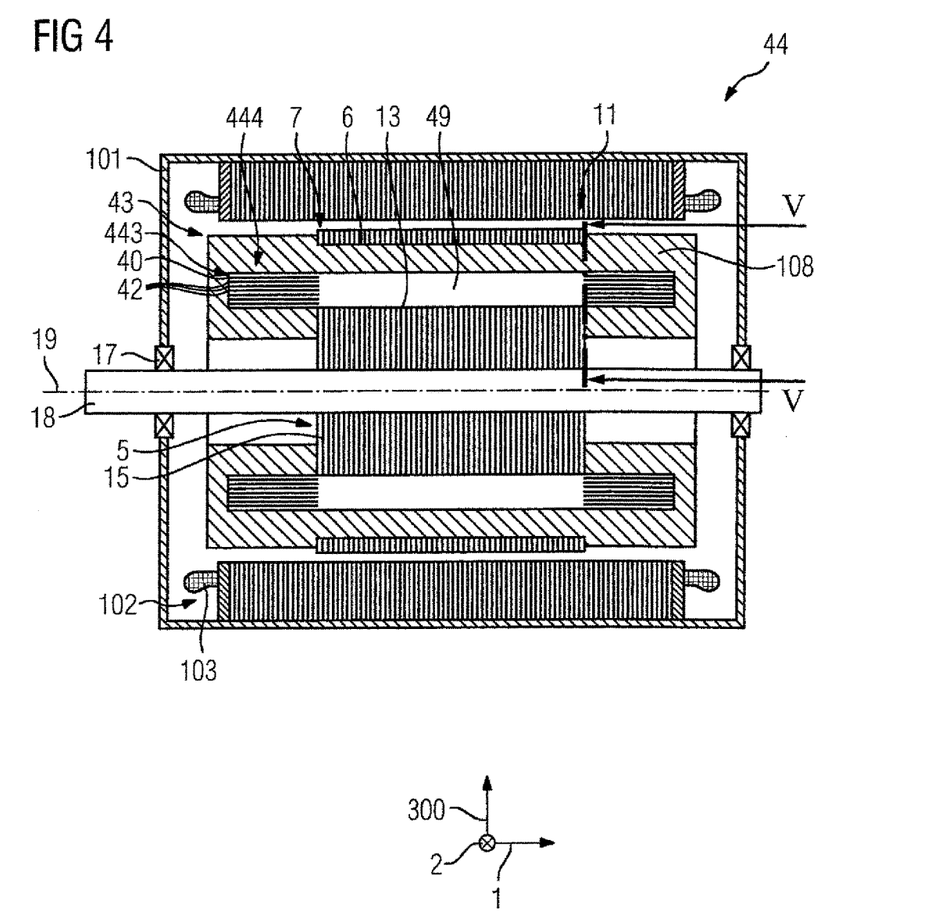
FIG. 4 shows a fourth exemplary embodiment of an electrical machine, which comprises a fourth exemplary embodiment of a cage rotor.

FIG. 4 shows a fourth exemplary embodiment of an electrical machine 44 which comprises a first exemplary embodiment of a cage rotor 43. A notch 40, which the bar end 444 has, enables the bar end 444 to be bent. An end face surface 443 of the bar 49 has the notch 40. The bar end 444 has a further notch 42 on the end face surface 443. The rotor laminated core 5 includes a first laminated sheet 15 at the axial end 7.

Figure 5:
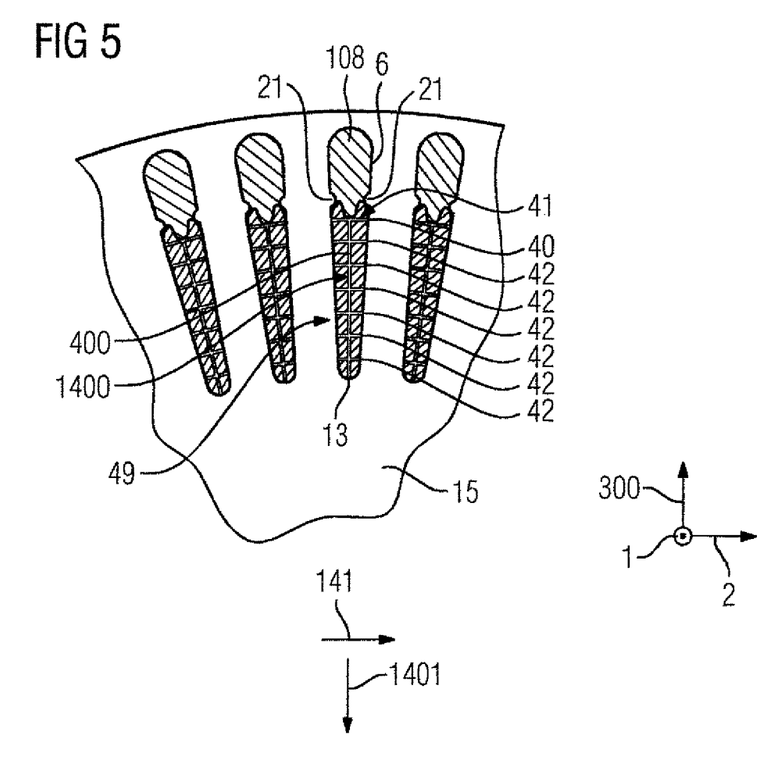
FIG. 5 shows a segment of a cross-section along the line V-V of FIG. 4.

FIG. 5 shows a segment of a cross section along the line V-V of FIG. 4. The segment of the cross section along the line V-V corresponds to a corresponding segment of a cross section along the first laminated sheet 15 at the axial end 7 of the cage rotor 43. The notch 40 on the end face surface 443 extends in a direction 141 which has a largest vectoral component in terms of amount in the first bar direction 2. The notch 40 has a cut surface 41 with the bar end 444.

The bar end 444 of the bar 49 has a notch 400 in the end face surface 443 which extends in a direction 1401 which has a largest vectoral component in terms of amount in the second bar direction 300. This notch 400 has a cut surface 1400 with the bar end 444.

As shown in FIG. 4, the notches 40, 42 end within the bar 49. The notches 40, 42 end in an area of the bar 49 which is already slightly arranged in the groove 6. Slightly in this case means that the notches 40, 42 extend by a width of the laminated sheet 15 into the groove 6. Thus the cutout of the cross section is made along the line V-V according to FIG. 5.

The bar 49 is arranged in a groove base 13 of the groove 6. The first material 108 is present in an area of the groove 6, which is further away in a radial direction from the axis of rotation 19 than the bar 49. The cage rotor 43 is shown in FIG. 4 in a position in which the radial direction corresponds to the second bar direction 300.

The rotor laminated core 5 can have positioning elements 21 in the groove 6. These can hold the bar 49 in a defined location, in order to maintain the position of the bar 49 in the groove base 13 during manufacturing of the cage rotor 43. The first laminated sheet 15 has the positioning elements 21, wherein these are connected in one piece with the sheet 15. Thus the first sheet 15 with its positioning elements 21 can be manufactured from one sheet of metal. In an advantageous manner a first laminated sheet 15 at the further axial end 11 of the rotor laminated core 5 also has positioning elements 21. The fact that the notches 40, 42, 400 give the bar end 444 a greater bendability than a bar section which is arranged within the groove 6 enable the bar end 444 to advantageously follow the shrinkage of the first material 108 during hardening of the melt, without the positioning elements 21 hindering this significantly.

Figure 6:
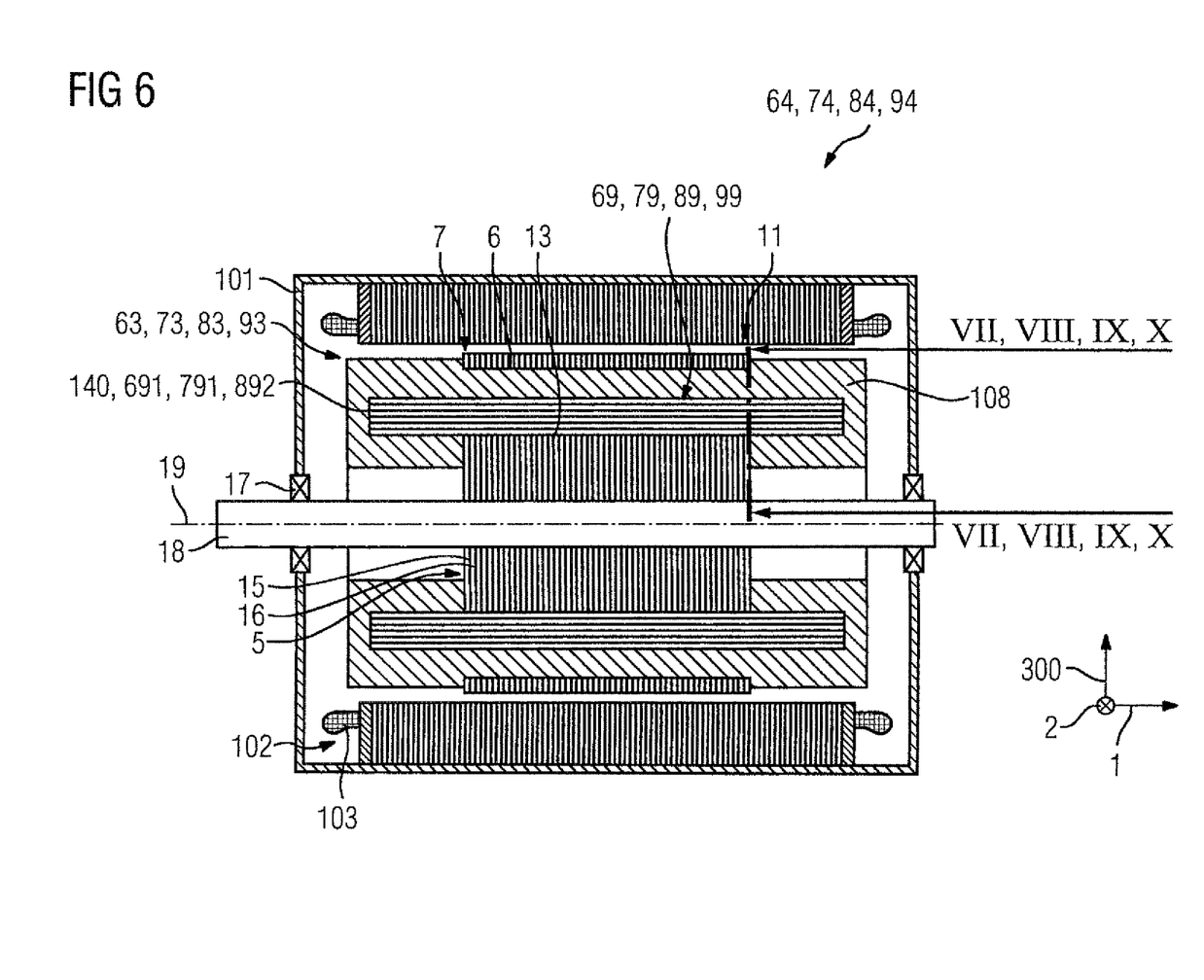
FIG. 6 shows a fifth, sixth, seventh and eighth exemplary embodiment of an electrical machine, which comprises a fifth, six, seventh or eighth exemplary embodiment of a cage rotor.

FIG. 6 shows a fifth, sixth, seventh and eighth exemplary embodiment of an electrical machine, which comprises a fifth, sixth, seventh or eighth exemplary embodiment of a cage rotor. The bar ends of the bars 69, 79, 89, 99 have notches 140, 691, 791, 892 and further notches. The distances in the second bar direction 300 of the notches 140, 691, 791, 892 and further notches are not the same for all exemplary embodiments. FIG. 6 does not give any information about the distances. If the distances of the exemplary embodiments are to be presented in relation to one another in figures, a separate figure would have to be created for each exemplary embodiment and draw in the distances qualitatively in accordance with the description.

Figure 7:
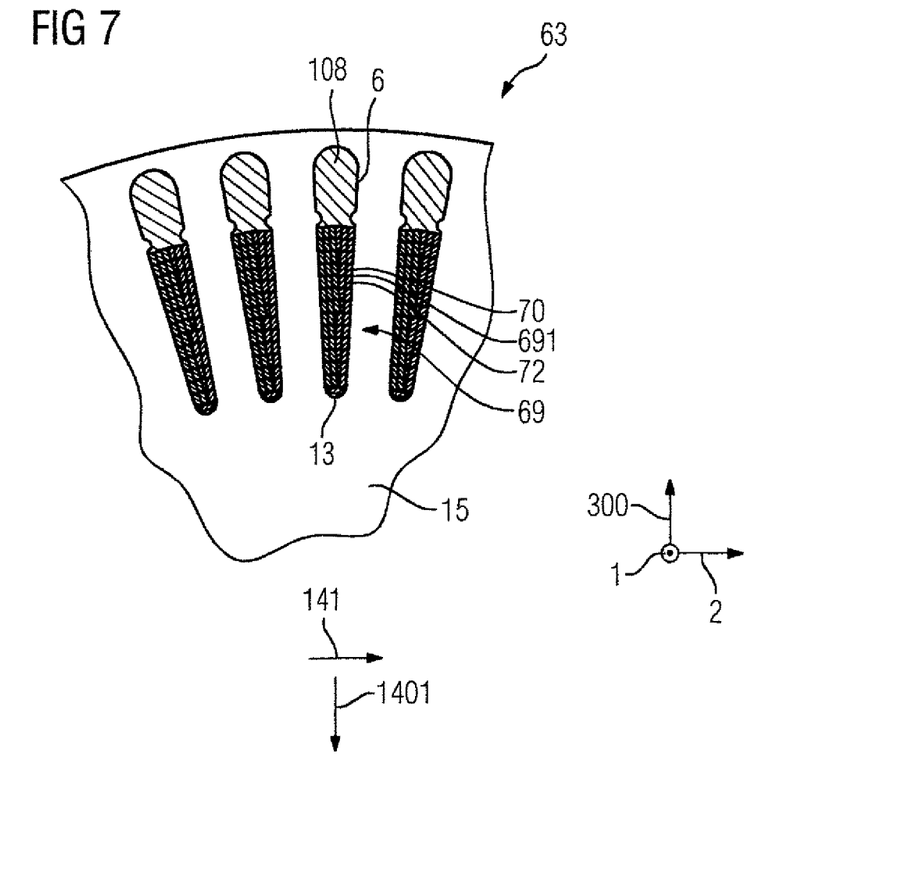
FIG. 7 shows a segment of a cross-section along the line VII-VII of FIG. 6.

FIG. 7 shows a segment of a cross section along the line VII-VII of the fifth exemplary embodiment of an electrical machine 64, which comprises a fifth exemplary embodiment of a cage rotor 63 in accordance with FIG. 6. The cutout of the cross section along the line VII-VII corresponds to a corresponding cutout of a cross-section along the first sheet 15 at the axial end 7 of the cage rotor 63. A cut surface, which has the notch 691 with the bar end, extends between a conductor element 70 and a further conductor element 72 which extend along the axial bar direction 1, wherein the cross section of the conductor element 70 and a cross-section of the further conductor element 72 are arranged within the cross-sectional planes of a bar 69. Cross-sections of the conductor element 70 and of the further conductor element in the groove 6 are arranged within the cross-sectional planes of the bar 69. The cross-sectional planes of the bar 69 form an envelope curve which surrounds the conductor element 70 and the further conductor elements. The conductor element 70 and the further conductor elements 72 have a rectangular cross-section.

Figure 8:
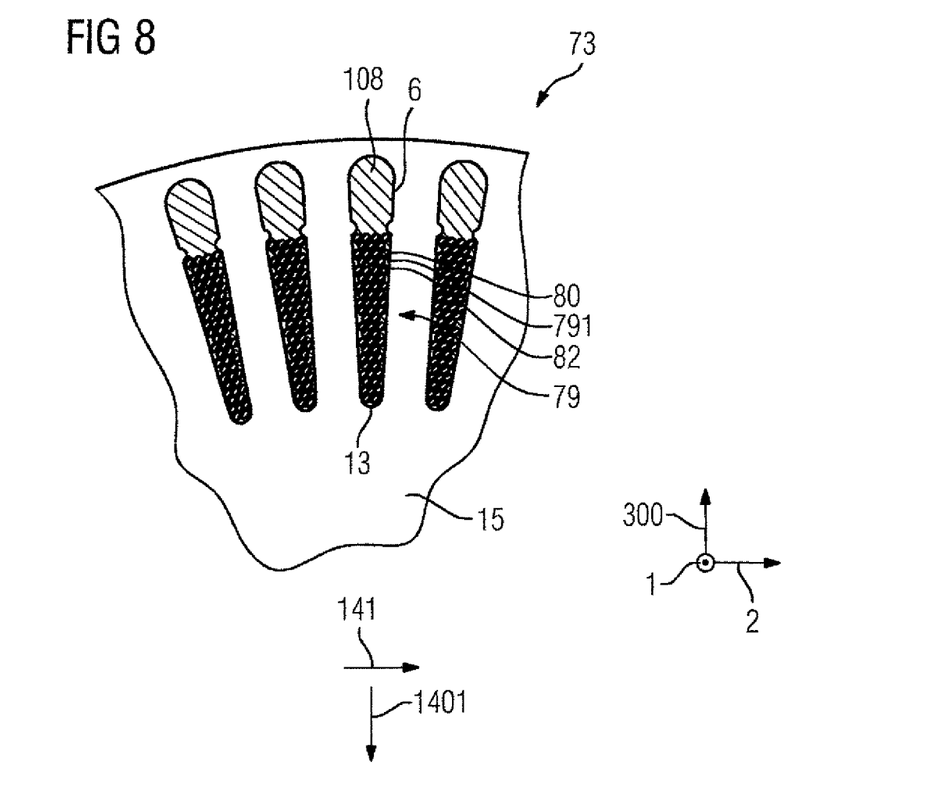
FIG. 8 shows a segment of a cross-section along the line VIII-VIII of FIG. 6.

FIG. 8 shows a segment of a cross section along the line VIII-VIII of the sixth exemplary embodiment of an electrical machine 74, which comprises a sixth exemplary embodiment of a cage rotor 73 in FIG. 6. The cutout of the cross section along the line VIII-VIII corresponds to a corresponding cutout of a cross-section along the first laminated sheet 15 at the axial end 7 of the cage rotor 73. A cut surface, which has the notch 791 with the bar end, extends between the conductor element 80 and the further conductor elements 82, which extend along the axial bar direction 1, wherein a cross-section of the conductor element 80 and a cross-section of the further conductor elements 82 are arranged within the cross-sectional planes of a bar 79. The conductor element 80 and the further conductor elements in the groove 6 are arranged within the cross-sectional planes of the bar 79. The cross-sectional planes of the bar 79 form an envelope curve which surrounds the conductor element 80 and the further conductor elements. The conductor element 80 and the further conductor elements have a circular cross-section.

Figure 9:
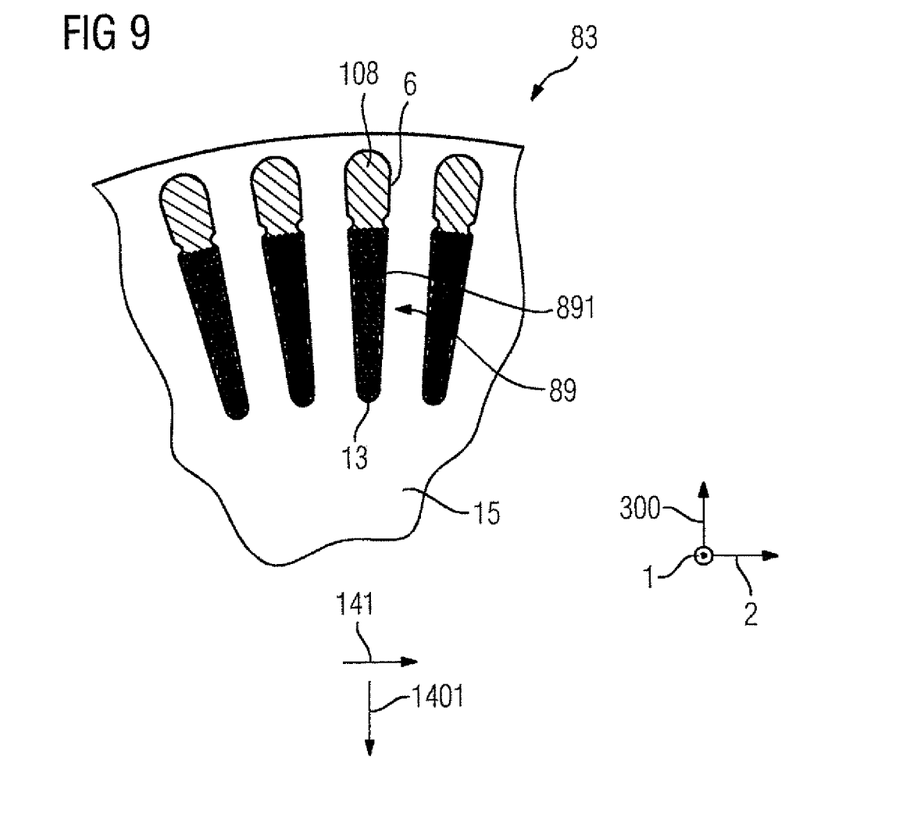
FIG. 9 shows a segment of a cross-section along the line IX-IX of FIG. 6.

FIG. 9 shows a segment of a cross section along the line IX-IX of the seventh exemplary embodiment of an electrical machine 84, which comprises a seventh exemplary embodiment of a cage rotor 83 in FIG. 6. The cutout of the cross section along the line IX-IX corresponds to a corresponding cutout of a cross-section along the first laminated sheet 15 at the axial end 7 of the cage rotor 83. The conductor elements 891 have a circular cross-section with a diameter which has a value of up to 1 mm.

Figure 10:
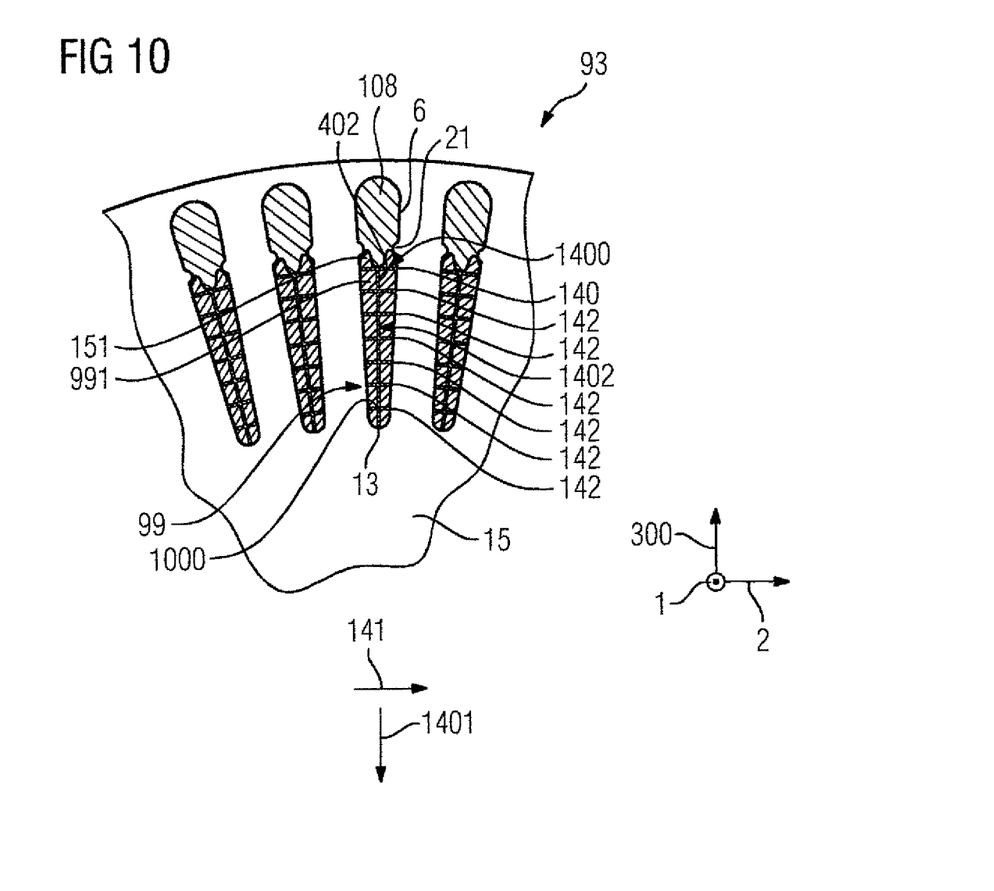
FIG. 10 shows a segment of a cross-section along the line X-X of FIG. 6.

FIG. 10 shows a segment of a cross section along the line X-X of an eighth exemplary embodiment of an electrical machine 94, which comprises an eighth exemplary embodiment of a cage rotor 93 in FIG. 6. The cutout of the cross section along the line X-X corresponds to a corresponding cutout of a cross-section along the first sheet 15 at an axial end 7 of the cage rotor 93. A bar 99, which has a conductor element 151 and further conductor elements 991 which extend along the axial bar direction 1, has a connection facility 1000 on the notch 140. This connection facility 1000 has a third material, which is aluminum.

The bar 99 has further notches 142 on the end face surface, which extend in a direction 141 which has a largest vectorial component in terms of amount in the first bar direction 2. The bar also has a notch 402 on the end face surface which extends in a direction 1401, which has the largest vectorial component in terms the amount in the second bar direction 300. All notches 140, 142 have a cut surface 1400, 1402 with the bar end. The cut surfaces 1400, 1402 extend from one bar end to a further bar end of the bar 99. The cut surfaces 1400, 1402 extend between the conductor element 151 and the further conductor elements 991 which extend along the axial bar direction, wherein the cross-sections of the conductor element 151 and the further conductor elements are arranged within the cross-sectional planes of the bar 99. The connection facility 1000 fills out at least partly all notches 140, 142, 402. The bar 99 thus advantageously has the shape usually used for a cage rotor. The connection facility 1000 connects the conductor element 151 and the further conductor elements so that the bar 99 can be advantageously introduced in one piece into the groove 6 and can also be used before its introduction into the groove 6 in a simple manner in a manufacturing process.

The notches 10, 12, 20, 22, 30, 32, 40, 42 in the bars 19, 109, 29, 39, 49 of the first to fourth exemplary embodiments are made by sawing into the bars 19, 109, 29, 39, 49.

The notches 691, 791, 892, 140, 142, 402 in the bars 69, 79, 89, 99 of the fifth to eighth exemplary embodiments have been made by arranging the conductor elements 70, 80, 151, 891, 991, the further conductor element 72, 82, 152 and further conductor elements in relation to the envelope curve of the bars 69, 79, 89, 99.

In the eighth exemplary embodiment the notches 140, 142, 402 in the bar 99 have additionally been filled at least partly with the third material, which is aluminum, in a molten state of the third material, in order to manufacture the notch 140, 142, 402. Inter alia the bar 99 can advantageously be pushed into the groove 6 in this way as a single bar.

Although the invention has been illustrated and described in greater detail by preferred exemplary embodiments, the invention is not restricted by the disclosed examples and other variations can be derived herefrom by the person skilled in the art, without departing from the scope of protection of the invention.

What is claimed is:

1. A cage rotor for an electrical machine, comprising:
a rotor laminated core having a groove;
a short-circuiting ring having a first material and cast onto an axial end of the rotor laminated core; and
a bar constructed from conductor elements having a circular or rectangular cross-section and having a diameter up to 1 millimeter, said bar being arranged in the groove and having a bar end, said bar end penetrating into the first material and having a plurality of notches, said plurality of notches having a penetration depth of at least 60 percent of a height of the bar, wherein the bar has a connection facility on each of the notches in the form of a bracket surrounding the bar or a material configured to at least partly fill up the plurality of notches, to hold the bar when inserted during manufacturing of the cage rotor or the electrical machine, wherein the bar has an outer surface provided with at least one notch, said at least one notch extending in a shape of a wedge from the outer surface into the bar to a notch depth.

2. The cage rotor of claim 1, wherein the bar end as a result of the presence of the notches has a flexibility which is greater than a flexibility of a bar section arranged within the groove.

3. The cage rotor of claim 1, wherein the bar has an end face surface provided with at least one notch.

4. The cage rotor of claim 3, wherein the bar defines an axis, said at least one notch extending on the end face surface in a first bar direction in perpendicular relation to the axis, said bar defined by a bar width measured in the first bar direction.

5. The cage rotor claim 3, wherein the bar defines an axis, said at least one notch extending on the end face surface in a second bar direction in parallel relation to the axis, said bar defined by a bar height measured in the second bar direction.

6. The cage rotor of claim 1, wherein the notches are sized to extend from the bar end to another bar end of the bar.

7. The cage rotor of claim 1, wherein the notches are sized to end within the bar.

8. The cage rotor of claim 1, wherein the bar defines an axis, said notches extending in a direction radial to the axis.

9. The cage rotor of claim 1, wherein the bar defines an axis, said notches extending in a direction of the axis.

10. The cage rotor of claim 1, wherein the outer surface has a further notch on a side of the outer surface lying opposite the at least one notch, the notches arranged in offset relationship.

11. An electrical machine, comprising a cage rotor including a rotor laminated core having a groove, a short-circuiting ring having a first material and cast onto an axial end of the rotor laminated core, and a bar constructed from conductor elements having a circular or rectangular cross-section and having a diameter up to 1 millimeter, said bar being arranged in the groove and having a bar end, said bar end penetrating into the first material and having a plurality of notches, said plurality of notches having a penetration depth of at least 60 percent of a height of the bar, wherein the bar has a connection facility on each of the notches in the form of a bracket surrounding the bar or a material configured to at least partly fill up the plurality of notches, to hold the bar when inserted during manufacturing of the cage rotor or the electrical machine, wherein the bar has an outer surface provided with at least one notch, said at least one notch extending in a shape of a wedge from the outer surface into the bar to a notch depth.

12. A method for manufacturing a cage rotor, comprising:
casting a short-circuiting ring onto an axial end of a rotor laminated core having a groove;
arranging a bar constructed from conductor elements having a circular or rectangular cross-section and having a diameter up to 1 millimeter, said bar being arranged in the groove and having a bar end in the groove such that a bar end penetrates a material of the short-circuiting ring; and
forming a plurality of notches in the bar end to provide the bar end with a flexibility which is greater than a flexibility of a bar section adjacent to the bar end so that the bar end is able to undergo an elastic or plastic deformation, when the bar end is exposed to forces encountered during shrinkage of the material of the short-circuiting ring, as the short-circuiting ring is cast onto the axial end of the rotor laminated core and the material solidifies, said plurality of notches having a penetration depth of at least 60 percent of a height of the bar, wherein the bar has a connection facility on each of the notches in the form of a bracket surrounding the bar or a material configured to at least partly fill up the plurality of notches, to hold the bar when inserted during manufacturing of the cage rotor or an electrical machine, wherein the bar has an outer surface provided with at least one notch, said at least one notch extending in a shape of a wedge from the outer surface into the bar to a notch depth.

* * * * *